United States Patent
Dealy et al.

(10) Patent No.: US 7,278,487 B1
(45) Date of Patent: Oct. 9, 2007

(54) METHODS OF USING CHEMICAL WASH COMPOSITIONS FOR REMOVING DRILLING FLUIDS

(75) Inventors: Sears T. Dealy, Comanche, OK (US); Jiten Chatterji, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/424,987

(22) Filed: Jun. 19, 2006

(51) Int. Cl.
*E21B 21/00* (2006.01)
(52) U.S. Cl. ...................................... 166/312
(58) Field of Classification Search .................... None
See application file for complete search history.

(56) References Cited

U.S. PATENT DOCUMENTS

| | | | |
|---|---|---|---|
| 3,244,638 A | 4/1966 | Foley et al. | |
| 3,634,387 A | * 1/1972 | Dougherty | ................ 530/506 |
| 3,799,874 A | 3/1974 | Parker | |
| 3,850,248 A | 11/1974 | Carney | |
| 3,896,031 A | 7/1975 | Carney | |
| 3,986,979 A | 10/1976 | Moorer et al. | |
| 4,108,779 A | 8/1978 | Carney | |
| 4,141,843 A | 2/1979 | Watson | |
| 4,217,229 A | 8/1980 | Watson | |
| 4,233,162 A | 11/1980 | Carney | |
| 4,355,996 A | 10/1982 | Dilling et al. | |
| 4,588,032 A | 5/1986 | Weigand et al. | |
| 4,775,744 A | 10/1988 | Schilling et al. | |
| 5,458,195 A | 10/1995 | Totten et al. | |
| 5,789,352 A | 8/1998 | Carpenter et al. | |
| 5,904,208 A | * 5/1999 | Ray et al. | ................... 166/312 |
| 6,063,737 A | 5/2000 | Haberman et al. | |
| 6,227,294 B1 | 5/2001 | Chatterji et al. | |
| 6,554,069 B1 | 4/2003 | Chatterji et al. | |
| 6,668,927 B1 | 12/2003 | Chatterji et al. | |
| 6,762,155 B2 | 7/2004 | Chatterji et al. | |
| 6,852,676 B1 | 2/2005 | Chatterji et al. | |
| 2006/0166898 A1 | 7/2006 | Chen | |
| 2006/0166939 A1 | 7/2006 | Chen | |

OTHER PUBLICATIONS

Halliburton brochure entitled "Alpha Spacer Cementing Spacer" dated 1999.
Halliburton brochure entitled "CleanBore A Surfactant" dated 2006.
Halliburton brochure entitled "CleanBore B Surfactant" dated 1999.

(Continued)

*Primary Examiner*—Brian E. Glessner
*Assistant Examiner*—Kerry W. Leonard
(74) *Attorney, Agent, or Firm*—Craig W. Roddy; Fletcher Yoder

(57) ABSTRACT

Methods of removing a fluid from a well bore with a chemical wash composition, and more particularly, methods of using chemical wash compositions comprising water, a sulfonated lignin, and a taurate are provided. In one embodiment, a method of at least partially removing a fluid from a well bore surface is provided that comprises: providing a chemical wash composition comprising water, a sulfonated lignin, and a taurate; and contacting the well bore surface with the chemical wash composition to thereby at least partially remove the fluid from the well bore surface.

20 Claims, 1 Drawing Sheet

OTHER PUBLICATIONS

Halliburton brochure entitled "CS-2 Spacer" dated 1999.
Halliburton brochure entitled "Dual Spacer B Surfactant" dated 1998.
Halliburton brochure entitled "Dual Spacer System" dated 2006.
Halliburton brochure entitled "Dual Spacer E Spacer" dated 2006.
Halliburton brochure entitled "Liquid Spacer Mix Cement Spacer Material" dated 1999.
Halliburton brochure entitled "MF-1 Cement Thinner" dated 2005.
Halliburton brochure entitled "Micro Fly Ash Cement Component" dated 1999.
Halliburton brochure entitled "Mud Flush Aqueous Solution" dated 2005.
Halliburton brochure entitled "SEM-8™ Surfactant" dated 2005.
Halliburton brochure entitled "Spacer 500 Polymer-Based Spacer" dated 1998.
Halliburton brochure entitled "Spacer 500 E+ Cement Spacer" dated 1999.
Halliburton brochure entitled "Super Flush Spacer" dated 1999.
Halliburton brochure entitled "Tuned Displacement Service" dated 2004.
Heathman, J.F. et al., "Case Histories Regarding The Application of Microfine Cements" IADC/SPE 23926.
Crook, Ronald J. et al., "Effective Cement Placement" Well Servicing, Mar./Apr. 1989, pp. 14-15.
Crook, Ronald J. et al., "Spacer Tech Saves".
Chan, Albert et al., "Single-Pass Displacement Cleanout Technique Saves Rig Time and Improves Well Productivity" SPE 30124 dated 1995.
Rueda, Francisco et al., "Hole Cleaning And Cement Design for Specific Formation Types" SPIE 34560 dated 2003.
Office Action from U.S. Appl. No. 11/424,996 dated Jul. 2, 2007.

* cited by examiner

METHODS OF USING CHEMICAL WASH COMPOSITIONS FOR REMOVING DRILLING FLUIDS

CROSS-REFERENCE TO RELATED APPLICATIONS

This application is related to U.S. application Ser. No. 11/424,996 filed on the same date herewith, entitled "Chemical Wash Compositions for Removing Drilling Fluids," the disclosure of which is incorporated herein by reference in its entirety.

BACKGROUND

The present invention relates to removing a fluid from a well bore with a chemical wash composition, and more particularly, to chemical wash compositions that comprise water, a sulfonated lignin, and a taurate. These chemical wash compositions may be used to remove or substantially displace a drilling fluid from a well bore.

Fluids are often used for a variety of purposes in subterranean applications. For instance, a variety of drilling fluids have been used in drilling subterranean well bores. As used herein, the term "drilling fluid" may refer to any of a number of liquid and gaseous fluids, and mixtures of fluids and solids (as solid suspensions, mixtures and emulsions of liquids, gases and solids) used in operations to drill well bores into subterranean formations. In some instances, a drilling fluid may be an aqueous-based fluid that comprises clays and/or polymers. During the drilling of a well bore in a subterranean formation, a drilling fluid may be used to, among other things, cool the drill bit, lubricate the rotating drill string to prevent it from sticking to the walls of the well bore, prevent blowouts by serving as a hydrostatic head to counteract the sudden entrance into the well bore of high pressure formation fluids, and remove drill cuttings from the well bore. A drilling fluid may be circulated downwardly through a drill pipe and drill bit and then upwardly through the well bore to the surface.

As the drilling fluid is circulated, a layer of solids referred to as a "filter cake" is formed on the walls of the well bore. The term "filter cake" as used herein may refer to the residue deposited on a permeable medium when a slurry, such as a drilling fluid, is forced against the medium under a pressure. Filter cake properties such as cake thickness, toughness, slickness and permeability are important because the cake that forms on permeable zones in the well bore can cause stuck pipe and other drilling problems. Reduced oil and gas production can result from reservoir damage when a poor filter cake allows deep filtrate invasion. A certain degree of cake buildup usually is desirable to isolate formations from drilling fluids. In openhole completions in high-angle or horizontal holes, the formation of an external filter cake is preferable to a cake that forms partly inside the formation. The latter has a higher potential for formation damage. The filter cake and gelled or partially gelled drilling fluid mixed therewith reduce or prevent additional fluid loss as the well is drilled.

Once the well bore has been drilled to a desired depth, the drill string and drill bit may be removed from the well bore, and a pipe string (e.g., casing, liners, etc.) may be introduced into the well bore. After the pipe string is introduced into the well bore, the well bore may be conditioned by circulating the drilling fluid downwardly through the interior of the pipe string and upwardly between the annulus of the exterior of the pipe string and the subterranean formation. The purpose of this conditioning, generally, is to remove as much of the filter cake and gelled or partially gelled drilling fluid from the walls of the well bore as possible. Unfortunately, however, oftentimes at the end of this conditioning process, the drilling fluid and filter cake remain on the surfaces of the well bore and on the pipe string. This can create problems with subsequent processing, such as in primary cementing operations, inter alia, because the cement composition is generally not compatible with the drilling fluid and/or filter cake. This incompatibility may result in a lack of bonding between the set cement composition and the surfaces in the well bore. This, in turn, may lead to the loss of zonal isolation, as well as other undesirable consequences.

To mitigate the above-described problem, chemical wash compositions containing surfactants and other chemicals have been introduced into the well bore between the drilling fluid and the cement composition. Chemical washes (also called "preflushes") and spacer fluids perform the same functions. The terms "chemical wash" and "chemical wash composition" as used herein may refer to a fluid, usually water-based, to thin and disperse mud in preparation for cementing. The chemical wash may be pumped ahead of the cement composition to help ensure effective mud removal and efficient cement placement. As the drilling fluid is displaced, the chemical wash contacts the drilling fluid remaining on the well bore and pipe string surfaces to at least partially remove the drilling fluid therefrom. Additionally, the chemical wash should also at least partially remove the filter cake as well. Other specialized chemical washes may be used in the remedial treatment of scales or paraffin deposits in production tubulars.

To mitigate the above-described problem, chemical wash compositions containing surfactants and other chemicals have been introduced into the well bore between the drilling fluid and the cement composition. Chemical washes (also called preflushes) and spacer fluids perform the same functions. A difference between the two, however, is usually recognized in that a spacer fluid is normally densified by adding a material with a fairly high specific gravity such as barite, while a preflush or wash is not so densified. As the drilling fluid is displaced, the chemical wash may contact the drilling fluid remaining on the well bore and pipe string surfaces to at least partially remove the drilling fluid therefrom. Additionally, the chemical wash should also at least partially remove the filter cake as well.

A problem associated with current chemical wash compositions is that due to the chemistry of the compositions, it must be prepared as a liquid, which becomes expensive to ship to remote locations. The current compositions may not be dried because they have a low ignition point, and may readily catch fire if the composition is dried.

SUMMARY

The present invention relates to removing drilling fluid from a well bore with a chemical wash composition and more particularly, to chemical wash compositions that comprise water, a sulfonated lignin, and a taurate.

In one embodiment, the present invention provides that a method of at least partially removing a fluid from a well bore surface comprising: providing a chemical wash composition comprising water, a sulfonated lignin, and a taurate; and contacting the well bore surface with the chemical wash composition to thereby at least partially remove the fluid from the well bore surface.

In another embodiment, the present invention provides a method of displacing a drilling fluid from a well bore comprising: providing a chemical wash composition comprising water, a sulfonated lignin, and a taurate; and introducing the chemical wash composition into the well bore to thereby at least partially displace the drilling fluid from the well bore.

The features and advantages of the present invention will be apparent to those skilled in the art. While numerous changes may be made by those skilled in the art, such changes are within the spirit of the invention.

BRIEF DESCRIPTION OF DRAWINGS

These drawings illustrate certain aspects of some of the embodiments of the present invention, and should not be used to limit or define the invention.

Figure 1:
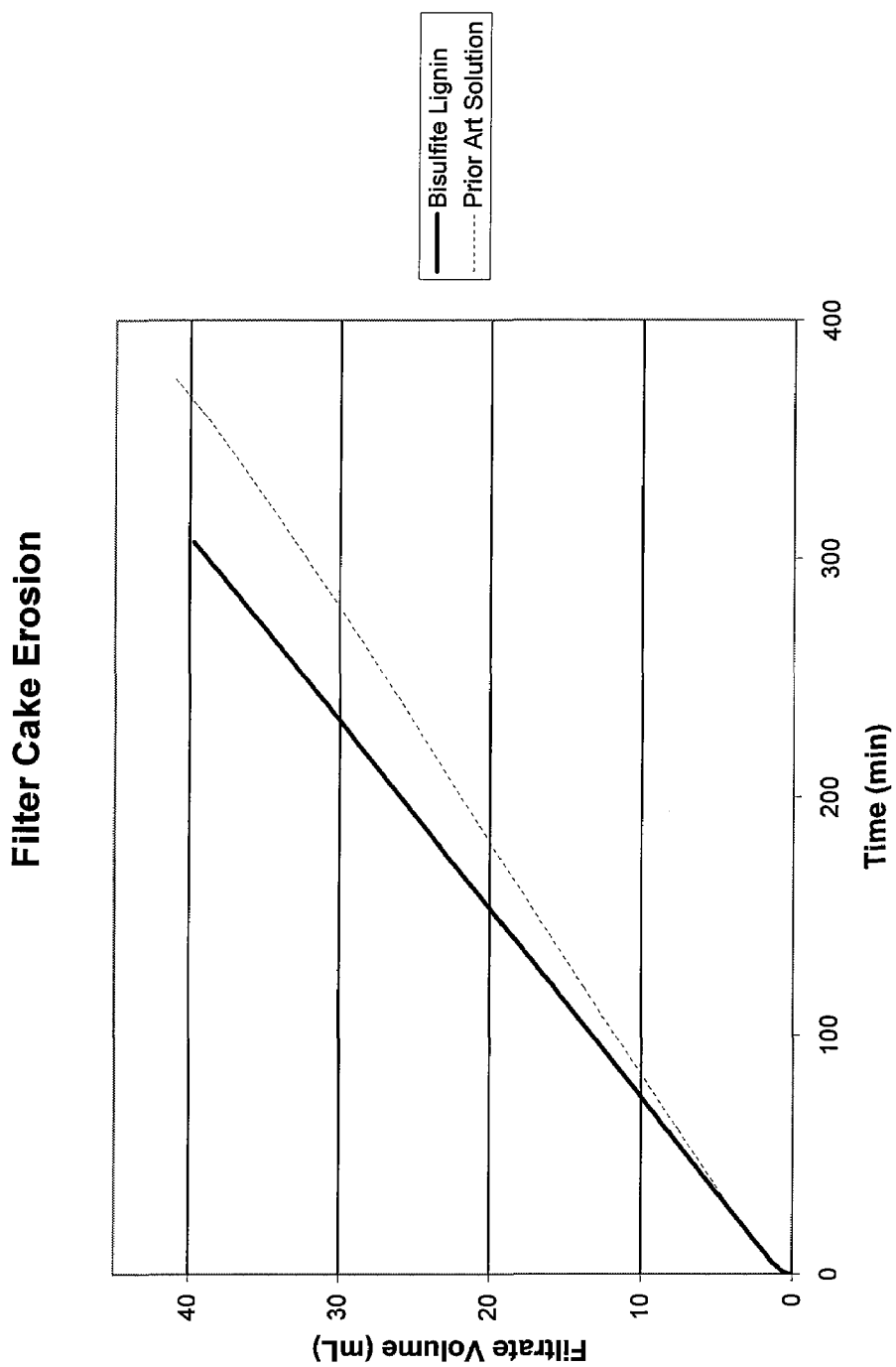
FIG. 1 compares filter cake removal properties vs. time of the removal solution of the present invention and a prior art solution, as described in Example 2.

While the present invention is susceptible to various modifications and alternative forms, a specific exemplary embodiment thereof has been shown by way of example in the drawing and are herein described in detail. It should be understood, however, that the description herein of specific embodiments is not intended to limit the invention to the particular form disclosed, but on the contrary, the intention is to cover all modifications, equivalents and alternatives falling within the spirit and scope of the invention as defined by the appended claims.

DESCRIPTION OF PREFERRED EMBODIMENTS

The present invention relates to removing a fluid from a well bore with a chemical wash composition, and more particularly, to chemical wash compositions that comprise water, a sulfonated lignin, and a taurate. These chemical wash compositions may be used to at least partially remove or substantially displace a drilling fluid from a well bore. As used herein, the term "remove" does not imply any particular degree of removal.

Among other things, the chemical wash compositions of the present invention may be used to at least partially remove a drilling fluid or a filter cake from a well bore surface. More preferably, the chemical wash compositions of the present invention may be used to at least partially remove a water-based drilling fluid or a filter cake from a well bore surface. Additionally, the chemical wash compositions generally should be capable of water wetting a well bore surface.

In certain embodiments, the chemical wash compositions of the present invention comprise water, a sulfonated lignin, and a taurate. In dry embodiments, the chemical wash compositions of the present invention will substantially comprise a sulfonated lignin and a taurate. The dry form may be useful for transport to a well site. This may be less expensive than transporting liquid forms. The dry compositions may be combined with water or other base fluid at a well site, for instance, to be used downhole. The term "dry," as used herein, does not imply any particular degree of dryness.

If used, the water used in the chemical wash compositions of the present invention may include freshwater, saltwater (e.g., water containing one or more salts dissolved therein), brine (e.g., saturated saltwater produced from subterranean formations), seawater, or combinations thereof. The water may be from any source, provided that it does not contain an excess of compounds that may adversely affect other components in the chemical wash composition. Generally, the water may be added in an amount such that the composition comprises about 30 to about 50% active ingredients.

A sulfonated lignin is also included in the chemical wash compositions of the present invention. The sulfonate lignin may be produced by the bisulfite process, i.e., a sulfonated bisulfite lignin, or be produced by sulfomethylation of a lignosulfonate with formaldehyde, i.e., a sulfomethylated lignosulfonate. In some embodiments, the sulfonated lignin may comprise a metal salt of the sulfonate lignin. A variety of metal salts of the sulfonated lignin may be used, including, but not limited to, sodium salts, ammonium salts, potassium salts, calcium salts, and combinations thereof.

A taurate is also included in the chemical wash composition of the present invention. Taurates are generally based on taurine, which is also known as 2-aminoethanesulfonic acid. In certain embodiments, suitable taurates may have carbon chains in the range of from $C_6$ to $C_{18}$. Examples of suitable taurates include N-alkyl-N-acyl taurate, such as N-methyl-N-palmitoyl taurate, N-methyl-N-cocoyl taurate, N-methyl-N-oleyl taurate, and their lauroyl, myristoyl, and stearoyl homologs. An example taurate comprises N-methyl-N-cocoyl taurate. In some embodiments, the taurate may comprise a metal salt of the N-alkyl taurate. A variety of metal salts of the taurate may be used, including, but not limited to, sodium salts, ammonium salts, potassium salts, calcium salts, and combinations thereof.

The sulfonated lignin and the taurate may be included in the chemical wash composition in a sulfonated lignin-to-taurate volume ratio in the range of from about 5:1 to about 1:5, alternatively, in a sulfonated lignin-to-taurate volume ratio in the range of from about 1:1 to about 3:1, and alternatively, and possibly more preferably, in a sulfonated lignin-to-taurate volume ratio of about 2:1. The sulfonated lignin and the taurate may be included in the chemical wash composition in a combined amount in the range of from about 0.1% to about 5% by weight of the chemical wash composition, and alternatively in a combined amount in the range of from about 1% to about 3% by weight of the chemical wash composition. One of ordinary skill, with the benefit of this disclosure should be able to determine the appropriate volume ratio and amount of the sulfonated lignin and taurate to include in the chemical wash compositions of the present invention.

Additional additives may be included in the chemical wash compositions of the present invention as deemed appropriate by one skilled in the art. Examples of suitable additives include, but are not limited to, viscosifying agents such as clays, diatomaceous earth, starches, polymers, or mixtures thereof. Suitable viscosifying agents often are hydratable polymers that have one or more functional groups. These functional groups include, but are not limited to, hydroxyl groups, carboxyl groups, carboxylic acids, derivatives of carboxylic acids, sulfate groups, sulfonate groups, phosphate groups, phosphonate groups, and amino groups. The chemical wash composition may also include, but are not limited to, other surfactants such as nonylphenol ethoxylates, alcohol ethoxylates, alpha-olefinsulfonates, alkylpolyglycosides, alcohol sulfates, salts of ethoxylated alcohol sulfates, alkyl amidoproply dimethylamine oxides, and alkene amidopropyl dimethylamine oxides.

Optionally, other additives may be added to the treatment fluids of the present invention as deemed appropriate by one skilled in the art with the benefit of this disclosure. Examples of such additives include, inter alia, defoamers, curing agents, salts, corrosion inhibitors, scale inhibitors, and formation conditioning agents.

The chemical wash compositions of the present invention may be used in any application in which it is appropriate or desirable to use such a composition. In some embodiments, the chemical wash compositions of the present invention may be used to at least partially remove a drilling fluid from surfaces in a well bore. Such well bore surfaces may include the exterior surface of a pipe string (if any) located in the well bore or the walls of the well bore. In some embodiments, the chemical wash composition may remove at least a substantial portion of a drilling fluid from the well bore surfaces. Additionally, the chemical wash compositions also may remove at least a portion of a filter cake from the well bore surfaces. Additionally, the chemical wash composition may also be used to displace a drilling fluid located in the well bore, for example, that at least partially fills an annulus between the subterranean formation and a pipe string located in the subterranean formation.

An example method of the present invention may comprise providing a chemical wash composition of the present invention comprising water, a sulfonated lignin, and a taurate, and contacting a well bore surface with the chemical wash composition to thereby at least partially remove the drilling fluid from the well bore surface. The contacting of the well bore surface with the chemical wash composition may be static, dynamic, or intermittently static and dynamic. Factors such as viscosity of the fluid, pump rate of the composition, and hole geometry may determine the conditions at which the composition is delivered. As those of ordinary skill in the art may appreciate, in chosen embodiments, the chemical wash composition may be introduced into the well bore intermittently and at varying rates to enhance dispersion of the drilling fluid and the filter cake into the chemical wash composition. In certain embodiments, the chemical wash composition may be introduced into the well bore in turbulent flow. Additionally, the contacting of the well bore surfaces with the chemical wash composition further may comprise introducing the chemical wash composition into the well bore so as to contact the well bore surfaces thereby at least partially dispersing the drilling fluid and the filter cake into the chemical wash composition. One of ordinary skill in the art with the benefit of this disclosure will recognize the appropriate conditions for delivery dictated by a desired use.

Additionally, in certain embodiments, the chemical wash composition may be introduced into an annulus between a subterranean formation and a pipe string located in the subterranean formation. In accordance with the methods of the present invention, a cement composition may be introduced into the annulus so that the chemical wash composition is at least partially displaced from the annulus. Thereafter, the cement composition may be allowed to set. The cement composition may be any cement composition suitable for use in subterranean formation. Generally, the cement composition may comprise water and a cement, and optionally any suitable additives.

Any cement suitable for use in the desired application may be suitable for use in the cement compositions of the present invention. While a variety of cements may be suitable, in some embodiments, the cement compositions of the present invention may comprise a hydraulic cement. A variety of hydraulic cements may be utilized in accordance with the present invention, including, but not limited to, those that comprise calcium, aluminum, silicon, oxygen, and/or sulfur, which set and harden by reaction with water. Suitable hydraulic cements, include, but are not limited to, Portland cements, pozzolana cements, gypsum cements, high alumina content cements, slag cements, and silica cements, and combinations thereof. Another example of a suitable cement is "MICRO MATRIX®" cement, which is commercially available from Halliburton Energy Services, Duncan, Okla. Yet another example of a suitable cement is a mixture of fly ash and lime.

Other additives suitable for use in subterranean operations may be added to the cement compositions as desired. Suitable additives may include fly ash, pozzalonic additives, set retarders, fluid loss control additives, surfactants, dispersants, micas, fibers, formation conditioning agents, bentonite, expanding additives, microspheres, weighting materials, defoamers, and the like.

To facilitate a better understanding of the present invention, the following examples of certain aspects of some embodiments are given. In no way should the following examples be read to limit, or define, the scope of the invention.

EXAMPLES

Example 1

The following experiment was performed, inter alia, to determine the ability of a mixture of bisulfite lignin salt and N-methyl-N-cocoyl taurate salt dissolved in water to remove water-based drilling fluid.

A cylinder of 1.9 inches in length and 1.6 inches in diameter formed of a 60 mesh screen was attached over the sleeve of a Fann Model 35 rotational viscometer having the Bob removed therefrom. The sleeve and the cylindrical screen were weighed to obtain their initial weight, $W_1$. The cylindrical screen attached to the sleeve was immersed into the viscometer cup containing 10 pounds per gallon of water-based drilling fluid formed of calcium and magnesium silicate. The cylindrical screen attached to the sleeve was left in the drilling fluid under static conditions for 10 minutes at room temperature. The sleeve and cylindrical screen were removed from the viscometer cup and a smooth, homogenous layer of drilling fluid was deposited on the cylindrical screen. The sleeve and screen were left for 2 minutes so that any excess drilling fluid dripped off. Thereafter, the bottom surface was gently wiped off using a paper towel. The sleeve, the screen, and the drilling fluid thereon were weighed, $W_2$. The weight of the drilling fluid deposited ($W_3$) was $W_3=W_2-W_1$. The cylindrical screen attached to the sleeve and coated with the drilling fluid was dipped into the viscometer cup containing the water-based drilling fluid removal solution of this invention having a concentration of bisulfite lignin salt and N-methyl-N-cocoyl taurate salt in a 2 to 1 ratio. The sleeve and the cylindrical screen attached thereto were rotated at 170 rpm for 15 minutes and then taken out of the drilling fluid removal solution. Excess solution was allowed to drip for 2 minutes and the bottom was wiped off gently with a paper towel. The sleeve and screen were weighed, $W_4$. The amount of water-based drilling fluid removed by the removal solution in 15 minutes was $W_3-W_4$. The test was repeated on the drilling fluid removal solution of this invention.

The water-based drilling fluid removal solution of this invention was replaced by a prior art water-based drilling fluid removal solution comprised of kraft lignin salt and sodium salt of N-methyl-N-oleyl taurine in a 2 to 1 ratio. This prior art drilling fluid removal solution is utilized for removing water-based drilling fluids from all types of formations. The above described experiment was repeated utilizing the prior art drilling fluid removal solution. A comparison of the drilling fluid removal properties of the removal solution of this invention and the prior art solution are set forth in Table I below.

TABLE I

| | % Mud Removed in 15 min. at 170$^{sec-1}$ |
|---|---|
| Prior Art Solution | 10.85 |
| Bisulfite Lignin (Test 1) | 11.39 |
| Bisulfite Lignin (Test 2) | 11.01 |

Example 2

The following experiment was performed to determine the ability of a mixture of bisulfite lignin salt and N-methyl-N-cocoyl taurate salt dissolved in water to remove water-based drilling fluid.

A Model 90 Dynamic Filtration Device developed by Fann Instruments, Inc. (a Halliburton Company) was used to compare a solution of bisulfite lignin salt and N-methyl-N-cocoyl taurate salt in a 2 to 1 ratio to Mud Flush (prior art solution) in removing a filter cake of simple bentonite mud. Mud Flush is a mixture of water, an anionic-nonionic surfactant blend, and sodium acid pyrophosphate, and is commercially available from Halliburton Energy Services. The test procedure for this experiment is outlined in SPE 84560 of the *Society of Petroleum Engineers Annual Technical Conference and Exhibition* in Denver, Colo. 5-8 Oct. 2003. When a filter-cake of simple bentonite mud was exposed to the new formulation, it took approximately 300 minutes of exposure before enough of the filter-cake was removed to allow dissipation of the entire fluid volume through the filter cake and simulated core. This compares to over 370 minutes that were required for the same volume of Mud Flush to pass through an identical filter cake and core. A comparison of the drilling fluid removal properties of the removal solution of this invention and the prior art solution is set forth in FIG. 1.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method of at least partially removing a fluid from a well bore surface comprising:
   providing a chemical wash composition comprising water, a sulfonated lignin, and a taurate, wherein the sulfonated lignin is chosen from the following group: a sulfonated bisulfite lignin and a sulfomethylated ligno-sulfonate, wherein the taurate has a carbon chain in the range of from $C_6$ to $C_{18}$; and
   contacting the well bore surface with the chemical wash composition to thereby at least partially remove the fluid from the well bore surface.

2. The method of claim 1 wherein the well bore surface is an exterior surface of a pipe string located in the well bore or a wall of the well bore.

3. The method of claim 1 wherein the sulfonated lignin comprises a metal salt of a sulfonated lignin.

4. The method of claim 1 wherein the sulfonated lignin comprises a metal salt of a sulfonated lignin chosen from the following group: a sodium salt, an ammonium salt, a potassium salt, calcium salt, and combinations thereof.

5. The method of claim 1 wherein the taurate comprises N-alkyl-N-acyl taurate or N-methyl-N-cocoyl taurate.

6. The method of claim 1 wherein the taurate comprises a metal salt of a taurate.

7. The method of claim 1 wherein the taurate comprises a metal salt of a taurate chosen from the following group: a sodium salt, an ammonium salt, a potassium salt, a calcium salt, and combinations thereof.

8. The method of claim 1 wherein the sulfonated lignin and the taurate are included in the chemical wash composition in a lignin-to-taurate volume ratio in the range of from about 5:1 to about 1:5.

9. The method of claim 1 wherein the step of contacting of the well bore surface with the chemical wash composition is static, dynamic, or intermittently static and dynamic.

10. The method of claim 1 wherein the chemical wash composition is introduced into the well bore in turbulent flow.

11. The method of claim 1 wherein the sulfonated lignin comprises the sulfonated bisulfite lignin.

12. A method of displacing a drilling fluid from a well bore comprising:
    providing a chemical wash composition comprising water, a sulfonated bisulfite lignin, and a taurate; and
    introducing the chemical wash composition into the well bore to thereby at least partially displace the drilling fluid from the well bore.

13. The method of claim 12 wherein the sulfonated lignin comprises a metal salt of a sulfonated lignin.

14. The method of claim 12 wherein the sulfonated lignin comprises a metal salt of a sulfonated lignin chosen from the following group: a sodium salt, an ammonium salt, a potassium salt, calcium salt, and combinations thereof.

15. The method of claim 12 wherein the taurate has a carbon chain in the range of from $C_6$ to $C_{18}$.

16. The method of claim 12 wherein the taurate comprises N-alkyl-N-acyl taurate or N-methyl-N-cocoyl taurate.

17. The method of claim 12 wherein the taurate comprises a metal salt of a taurate.

18. The method of claim 12 wherein the taurate comprises a metal salt of a taurate chosen from the following group: a sodium salt, an ammonium salt, a potassium salt, a calcium salt, and combinations thereof.

19. The method of claim 12 wherein the sulfonated lignin and the taurate are included in the chemical wash composition in a lignin-to-taurate volume ratio in the range of from about 5:1 to about 1:5.

20. The method of claim 12 wherein the step of introducing the chemical wash composition into the well bore is static, dynamic, or intermittently static and dynamic.

* * * * *